United States Patent [19]
Orain

[11] 3,942,335
[45] Mar. 9, 1976

[54] CONSTANT VELOCITY UNIVERSAL JOINT

[75] Inventor: Michel Orain, Conflans-Sainte-Honorine (Yvelines), France

[73] Assignee: Societe Anonyme: Glaenzer Spicer, Poissy, France

[22] Filed: June 24, 1974

[21] Appl. No.: 482,555

[30] Foreign Application Priority Data
Oct. 9, 1973 France .............................. 73.36078

[52] U.S. Cl. ........................................ 64/21; 64/8
[51] Int. Cl.² ........................................... F16D 3/30
[58] Field of Search ................................. 64/21, 8, 7

[56] References Cited
UNITED STATES PATENTS

| | | | |
|---|---|---|---|
| 2,206,291 | 7/1940 | Nelson | 64/21 |
| 3,125,870 | 3/1964 | Orain | 64/21 |
| 3,538,721 | 11/1970 | Reddy | 64/21 |
| 3,795,118 | 3/1974 | Kesl | 64/21 |

FOREIGN PATENTS OR APPLICATIONS

| | | | |
|---|---|---|---|
| 698,945 | 10/1940 | Germany | 64/21 |
| 450,586 | 7/1936 | United Kingdom | 64/21 |

*Primary Examiner*—Samuel Scott
*Assistant Examiner*—Randall Heald
*Attorney, Agent, or Firm*—Baldwin, Wight & Brown

[57] ABSTRACT

A constant velocity universal joint for transmitting motion between two shafts which are intended to be run at an angle. An even number of spindles preferably equal to, or greater than, four are mounted on a hub member fixed to one of the shafts. Rollers with part-spherical outer rolling surfaces are slidably and rotatably mounted on the spindles and cooperate with corresponding opposed pairs of grooves formed in a cup member fixed to the other shaft. The angle formed between the longitudinal axis of one of the spindles with the axis of its respective shaft being equal to the angle formed between the longitudinal axis of its corresponding pair of opposed grooves and the axis of the latter's respective shaft. This angle between 15° and 45° may differ from one spindle and its pair of opposed grooves to another such unit. Alternatively two spindles and two grooves could be fixed on one shaft and two other grooves and two other spindles could be fixed to the other shaft for cooperation with one another. The axes of the spindles may either converge or diverge beyond the free ends of their respective shafts.

14 Claims, 11 Drawing Figures

CONSTANT VELOCITY UNIVERSAL JOINT

The present invention relates to constant velocity universal joints for rotational power transmission and more particularly such joints in which the force transmitting members are part-spherical rollers which rotate and slide on smooth spindles fixed relative to one another and to a first shaft and which roll and slide in grooves circular in cross-section formed in a member fixed to another shaft.

Different types of constant velocity universal joints of this variety have been proposed. For example, German Pat. No. 563,825 describes a constant velocity joint which comprises two rollers carried by spindles diverging from the end of one of the shafts to be coupled and cooperating with straight grooves in two diverging portions carried at the end of the other shaft to be coupled. Although this is not expressly mentioned in the German patent, in order to operate properly, such a joint requires a particular centering means which in addition must withstand very large radial pulsating forces when the joint runs at an angle. Further, the centering means has to be extremely accurate for true constant velocity operation of the joint. This makes such joints very expensive, large in size, sources of friction and therefore considerably diminishes the interest in industrially developing them: moreover, to the extent of the applicant's knowledge, such joints have not been extensively marketed.

It has also been proposed to provide such joints comprising three rollers carried by the spindles on one of the shafts cooperating with three grooves assemblies formed in a member fixed to the other shaft (c.f., French Pat. No. 1,272,730 in particular). Such a joint has perfect constant velocity characteristics without needing to incorporate particular centering means and its operation gives full satisfaction in a wide variety of application in drives of front wheel drive motor vehicles. Nevertheless, such joints have a drawback by the fact that they develop, when they run at angle with transmitting a torque, considerable axial pulsating forces at the rate of one per revolution which constitutes a serious disadvantage when such a device is used in a free sliding joint, these pulsations being more difficult to overcome as the path of sliding movement of the rollers along their spindles does not permit a substitution of needle bearings, for example, for the sliding.

Finally, it has already been proposed to provide joints of the aforementioned type with four rollers mounted on the spindles located in a plane perpendicular to the shaft carrying the same, but such joints are only possible in practice if the spindles have the possibility of oscillating which not only brings about considerable complications in construction, but in addition renders constant velocity operation uncertain.

Unexpectedly it has been found that by using an even number of rollers equal to or greater than four mounted on spindles arranged obliquely with respect to the shaft on which they are carried, it is possible under certain particular conditions to provide joints of the sought after type which have perfect constant velocity transmission without requiring particular centering or other means and which do not produce axial pulsating movements nor relative planetary movement, jerking or eccentric operation, when running at an angle.

Consequently, an aspect of the invention consists in a constant velocity universal joint in which transmission of motion between the two shafts which are adapted to form an angle between one another is ensured by an even number of rollers with spherical outer rolling surfaces mounted for rotational and sliding movement on spindles fixed to one of the shafts, the axes of the shafts being situated in planes passing through the axis of said one shaft and obliquely with respect thereto, each of the rollers cooperating with a pair of opposed grooves part-circular in cross-section, corresponding to the outer surface of the rollers and formed in a member fixed to the other shaft, the longitudinal axes of the pairs of grooves also being located in planes passing through the axis of said other shaft and obliquely with respect thereto, wherein the improvement comprises at least four rollers and corresponding spindles, the angles made by the axis of a spindle and by the axis of the corresponding pair of grooves with the axes of the shafts to which the spindle and the pair of grooves are fixed respectively, are equal to one another and preferably between 15° and 45°, the angular distribution and the spatial arrangement of the spindles and the pairs of grooves on their respective supports being optically symmetrical when said shafts are in alignment.

The rollers and therefore the corresponding spindles and pairs of grooves are preferably four in number. The axes of the spindles and the pairs of cooperating grooves may diverge with respect to the axis of the shaft on which they are carried beyond the end thereof, or conversely they may converge with respect to the axis of the shaft beyond the end thereof. The axes of all the spindles and all the pairs of grooves need not make the same angle with the axis of the corresponding shaft, provided this angle is the same for a given spindle and its corresponding pair of cooperating grooves. Thus, it is possible to provide joints with four spindles including two so-called divergent spindles in a first diametral plane of the shaft carrying them and two so-called convergent spindles in another diametrical plane thereof, the grooves cooperating with these spindles are naturally arranged in a corresponding manner.

Likewise, the spindles, and therefor pairs of grooves cooperating therewith, need not be angularly spaced equally about the axis of the shaft carrying them provided the two cooperating parts are perfectly symmetrical with respect to a plane perpendicular to the axis of the shaft when the latter are in alignment. Therefore an unequal spacing of the spindles at the end of one of the shafts is possible provided this unequal angular spacing is symmetrically the same as that of the grooves.

Nor is it necessary for the spindles to be fixed to a given one of the shafts and the grooves to be consequently formed in a member adapted to be integral with the other shaft. A member adapted to be integral with one of the shafts may, for example, carry a pair of diametrically opposed spindles cooperating with grooves formed in a member integral with the other shaft, the last mentioned member itself carrying two spindles cooperable with pairs of grooves formed in the member fixed to the first shaft.

Owing to the above arrangements, the joint according to the invention has perfect constant velocity operation when running at an angle, the drive members or rollers being strictly maintained in a plane bisecting the angle between the shafts coupled for rotation, the resulting constant velocity operation of the two shafts which constantly passes through a point in the bisector plane providing operation free of relative planetary movement of jerks or eccentric operation.

The relative radial centering of the two shafts is of course ensured by the rollers and the torque transmission by the simultaneous action of at least four rollers which are received in a space of reduced diameter without creating lost space thus resulting in a high output per given volume of space.

Moreover, the telescopic sliding movements in both axial direction, are very free when the joint runs at an angle under no-load conditions in spite of sliding between spindles and the rollers as well as between the rollers and the grooves. Indeed, when the joint runs at an angle with transmitting a torque, the rollers rotatably and slidably reciprocate on the spindles and rollingly and slidingly reciprocate in the grooves. Consequently, first angular operation of the joint by movements created in the connecting members ensures the cancelling of the friction of the connecting operation, ensures the cancelling of the sliding friction function which involves the same sliding movements and which therefore can operate very smoothly without substantial axial resistance and with very small forces.

Finally, during running of the joint at an angle with transmitting a torque, the directions of sliding and rotational movements, and rolling and sliding movements of the rollers are opposite for diametrically opposed rollers; the friction forces produced cancel each other out for each pair of rollers without pulsating axial efforts resulting in other words, in the joint according to the invention the running at an angle does not introduce spurious axial pulsations in the sliding movement as is the case in joints having an odd number of connecting members in a coordinate arrangement.

As previously mentioned, the angle of inclination of the axis of a spindle and that of its corresponding pair of cooperating grooves is preferably between 15° and 45°.

An angle less than 15° could lead to precarious operation especially since this angle could be even further reduced and that the sliding conditions — surface conditions and lubrication — could be less favorable.

Above 45° the possibilities of axial sliding movements are greatly reduced and such a joint is of no practical interest.

Various embodiments of the joint according to the invention are described hereinafter with reference to the accompanying drawings in which.

Figure 1:
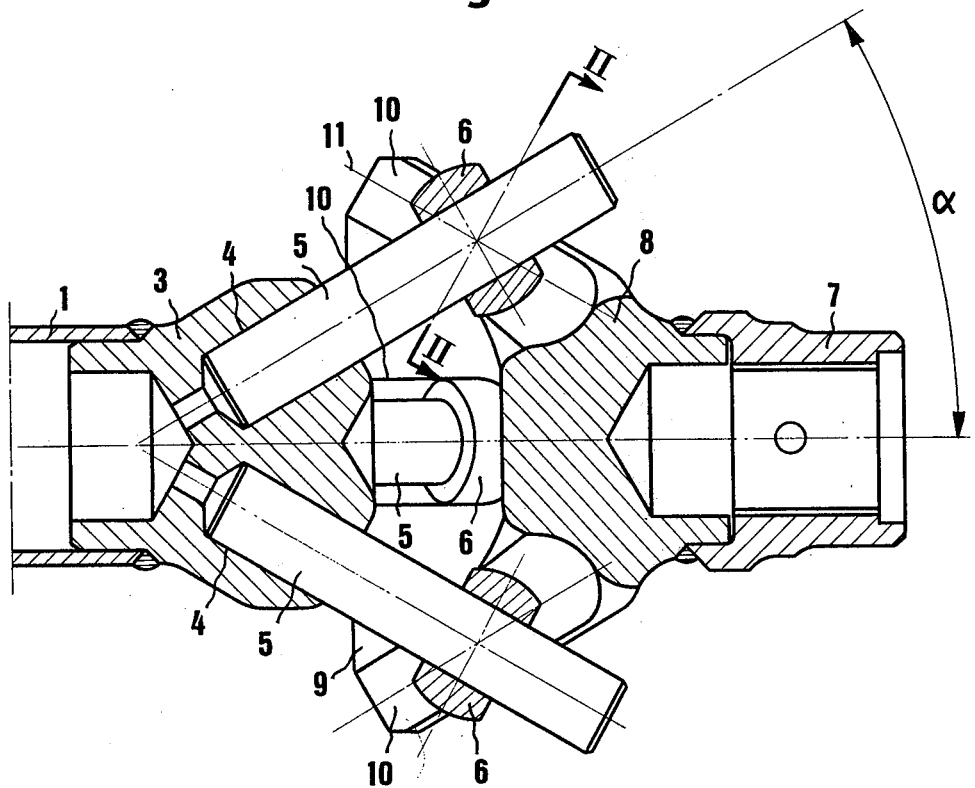
FIG. 1 is a longitudinal section view of a first embodiment of the joint with the shafts in alignment with each other.
Figure 2:
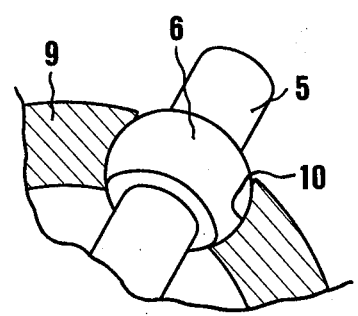
FIG. 2 is a detail view, partly in section, taken on line II—II in FIG. 1.
Figure 3:
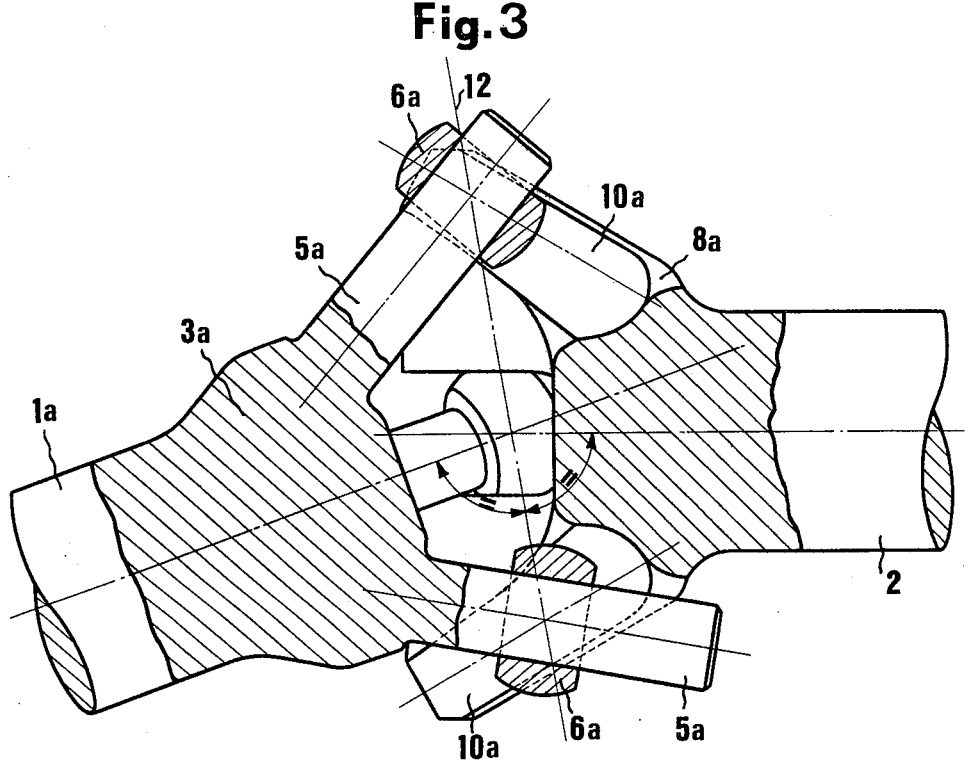
FIG. 3 is a longitudinal sectional view of an alternative embodiment from only the point of view of the make up of the shafts to be coupled in the joint shown in FIGS. 1 and 2, the joint being illustrated in a position in which the driving shaft and the driven shaft are not in alignment forming a certain angle other than a straight angle therebetween.
Figure 4:
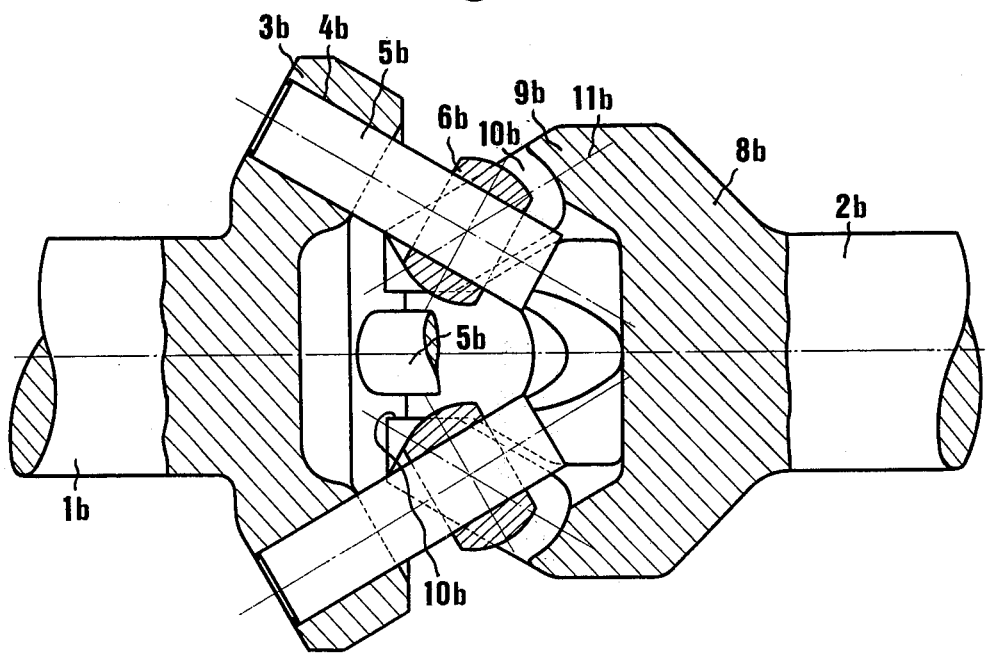
FIG. 4 is a longitudinal sectional view of yet another embodiment of the joint according to the invention.

As illustrated in FIGS. 1 and 2, the joint according to the invention is intended to couple a first shaft 1 to a second shaft (not shown in FIG. 1, but the equivalent thereof is shown at 2a and 2b in FIGS. 3 and 4, respectively).

The hollow tubular shaft 1 has a hub member 3 welded at the end thereof. Four holes 4 are provided in the hub member 3, the axes of two of the holes lying in a first plane passing through the axis of the shaft 1, the axes of the other two holes lying in a second plane perpendicular to the first plane and also passing through the axis of the shaft 1, and the axes of the holes making 30° angles with the axis of the shaft 1. Each of the four holes 4 receives a spindle 5 on which a roller 6 is mounted for rotational and sliding movement. An internally splined sleeve 7 is mounted on the second shaft and welded to the closed end of a conical cup member 9 in which straight channels are cut defining the grooves or flanks 10 which are part-circular in cross-section with the centers along the median longitudinal axis 11 of each channel. The axes 11 of the channels are grouped in pairs in the planes perpendicular to each other passing through the longitudinal axis of the second shaft, each axis 11 making an angle of 30° therewith. Each of othe channels which are open inwardly and outwardly of the cup member 9 receives one of the rollers 6 having a spherical outer surface with a radius equal to or slightly less than that of the grooves 10. The rollers 6 are adapted to roll and slide in the grooves 10 for transmitting useful driving force of the joint between the shafts through the hub member 3, the spindles 5 the grooves 10 and the cup member 9 and, if necessary, the sleeve 7, the transmission could be effected from the first shaft 2 to the second shaft or from the second shaft to the first shaft.

In the alternative embodiment of FIG. 3, the same basic elements are present and are designated with the same references with the addition of an *a*. The sole practical constructional differences compared to the embodiment of FIGS. 1 and 2 are that the hub member 3a and the spindles 5a which are fixed to one another are integral with one another here and form one piece with the solid shaft 1a and that the cup member 9a also forms a single piece with the shaft 2. The two cooperating members of this joint may be obtained by a method and apparatus of cold-forming such as described copending in French Patent application No. 73.13 830, and the spindles 5a being effected by extrusion.

It is noted that the two shafts may be axially displaced as well as angularly inclined with respect to one another, the centers of the rollers 6 (or 6a ) remaining in any case in the plane bisecting the angles formed by the axes of the shafts and shown in the plane of FIG. 3 as a line 12; owing to the same, the joint is of perfect constant velocity operation. The presence of the four rollers effect a self-stabilization of the joint without axial pulsation. As previously stated, it is of primary importance that the angle $\alpha$ between the axis of a spindle 5 and the axis of the shaft 1 should be equal to the angle formed between the axis of the cup member 9 and the shaft to which it is fixed, grooves 10 with which the roller carried by the spindle cooperates, this angle is not necessarily the same for all spindle-grooves units as indicated hereinafter.

Moreover, the angular distribution and the arrangement of the spindles 5 and the grooves 7 on the hub member 3 and in the cup member 9 respectively, must be perfectly symmetrical with respect to the bisector plane 12 (FIG. 3) of the angle between the two shafts which does not preclude an angularly unequal distribution of the spindles 5 and the grooves 10 about the axis of their respective shafts as will be described hereinafter.

In the embodiment of FIG. 4, the same basic elements as in the preceding embodiments are shown again and designated by the same reference number with the addition of a b. In this embodiment, the hub member 3b fixed to the first shaft 1b is formed as a conical flange in which bores 4b are provided for receiving the spindles 5b such that the axes of the spindles make with the longitudinal axis of the shaft 1b an angle of 30° symmetrically with respect to the bisector plane and equal to the angle the axis of the shaft 1 makes with the spindles 5 in the embodiment of FIG. 1, i.e., the spindles 5b converge towards the axis of the shaft 1b beyond the hub member 3b instead of diverging as is the case with the spindles 5 extending from the hub member 3 in the embodiment of FIG. 1. Correspondingly, the cup member 9b which is integrally formed with the second shaft 2b forms a convergent structure starting from closed end 8b of the cup member toward the axis of the shaft 2b. The angles between the axes 11b of the channels formed by the grooves 10b in the cup member converge as previously mentioned, being 30° here too, i.e., equal to the angles the axes of the spindles 5b make with the axis of the shaft 1b. For the sake of clarity, only a part of the third spindle 5b is shown in FIG. 4, the corresponding roller of this spindle also being omitted.

Figure 5:
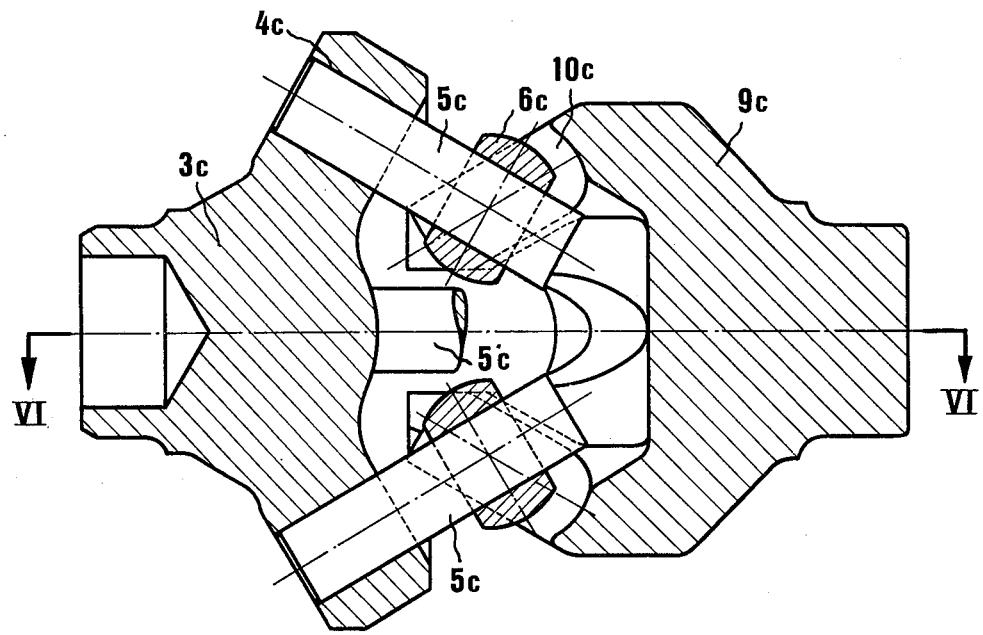
FIG. 5 is a similar view for a further embodiment.
Figure 6:
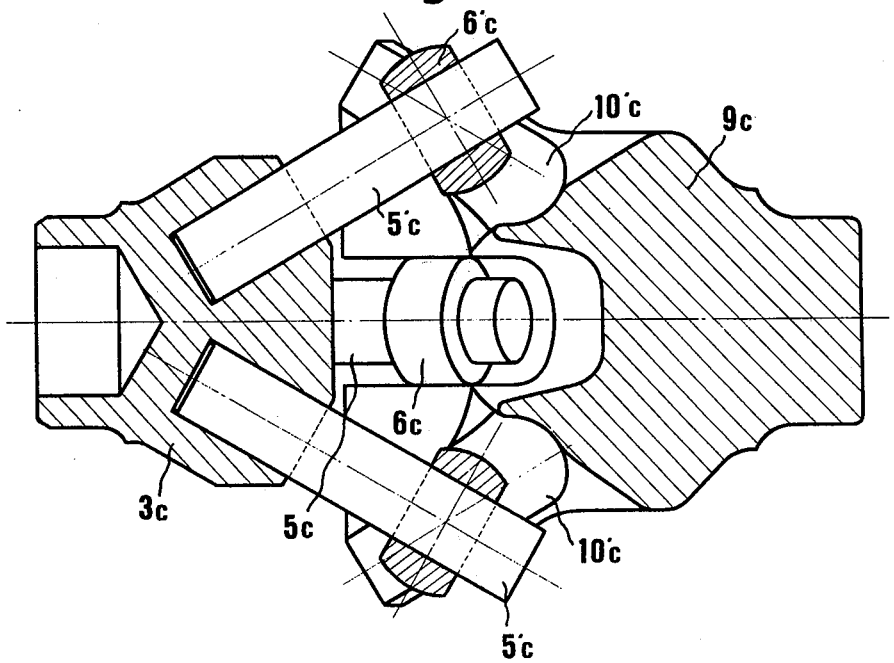
FIG. 6 is a sectional view taken on line VI—VI in FIG. 5.

In the embodiment of FIGS. 5 and 6 in which elements corresponding to those of the preceding embodiment are designated by the same reference numerals with a c, and in certain cases, also with a prime ('), a combination of the arrangements of the embodiments of FIGS. 1 (or 3) and 4 is provided, insofar as two pairs of spindles 5c and corresponding channels 10c converge beyond the shafts on which they are carried, whereas another pair of spindles 5'c located in a plane perpendicular to that of the first pair of spindles 5c, as well as their corresponding grooves 10'c diverge beyond the end of the shaft on which they are carried. In this case, the angles which the axis of each spindle and the axis of each groove 10c makes with the axes of their respective shafts are equal, but these angles are opposite from one spindle-grooves unit to the adjacent spindle-grooves unit.

Figure 7:
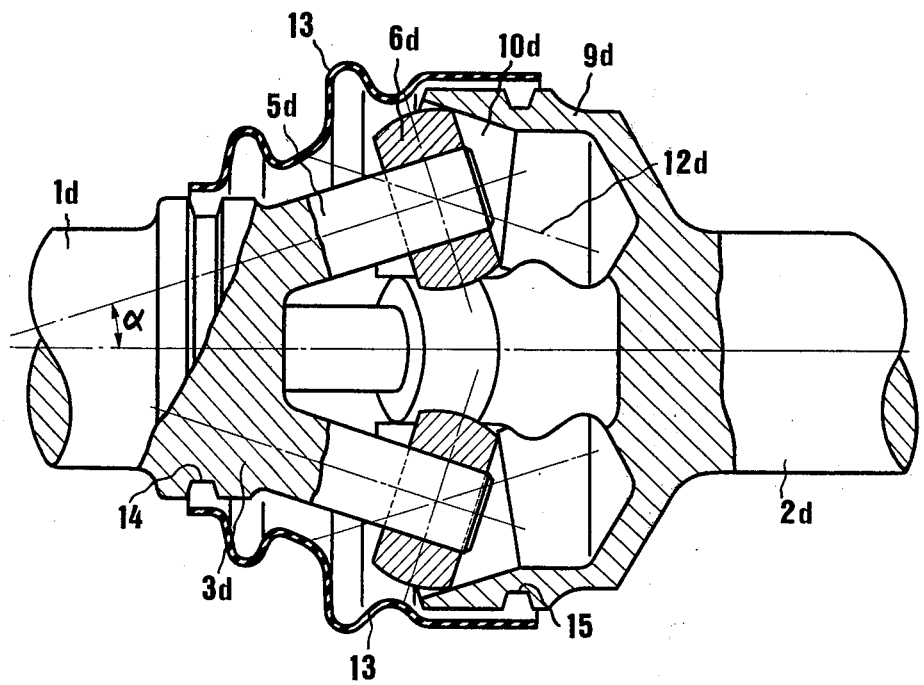
FIG. 7 is a longitudinal sectional view of (a novel) an embodiment of the joint according to the invention.
Figure 8:
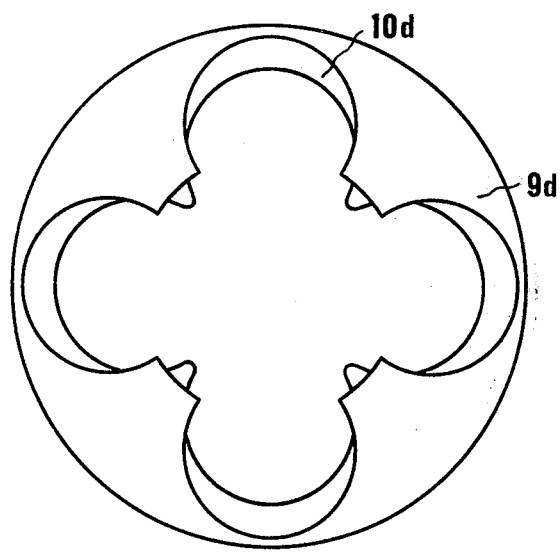
FIG. 8 is an end view of the cup member of the joint illustrated in FIG. 7.

In the embodiment of FIGS. 7 and 8, members corresponding to those in the preceding examples are designated by the same reference numerals with the addition of the reference letter d. The arrangement of the members of this embodiment is similar to that of the embodiment illustrated in FIG. 3 to the extent that the four spindles 5d diverge beyond the hub member 3d whereas the grooves 10d formed in the cup member 9d diverge beyond the end of the shaft 2d with which the cup member is integrally formed. However, the angle α that the axes of the spindles 5b make and the axes 12d of the grooves 10d make with the axis of the shaft 2d are only 17°30. In addition, the grooves 10d are not open to the outside of the cup member, the cup member having a continuous outer wall which makes it possible to provide a fluidtight casing for retaining lubricant in the joint owing to an elastic bellows 13, for example made of silicon rubber or similar elastomeric material, which may be secured about the hub member 3d and about the cup member 9d by means of elastic (piano string) rings (not shown) which clamp the ends of the bellows 13 in annular grooves 14 and 15 formed in the hub member 3d and the cup member 9d respectively, the bellows 13 being shown in its position before its ends are clamped to secure it in place.

Figure 9:
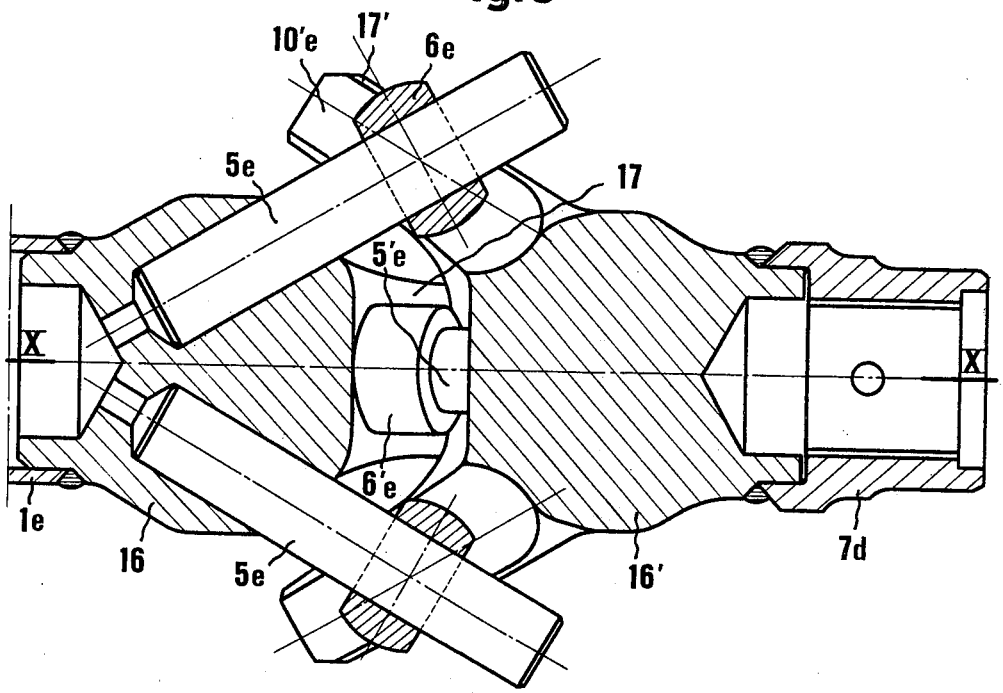
FIG. 9 is a longitudinal sectional view of an even further embodiment of the joint according to the invention.
Figure 10:
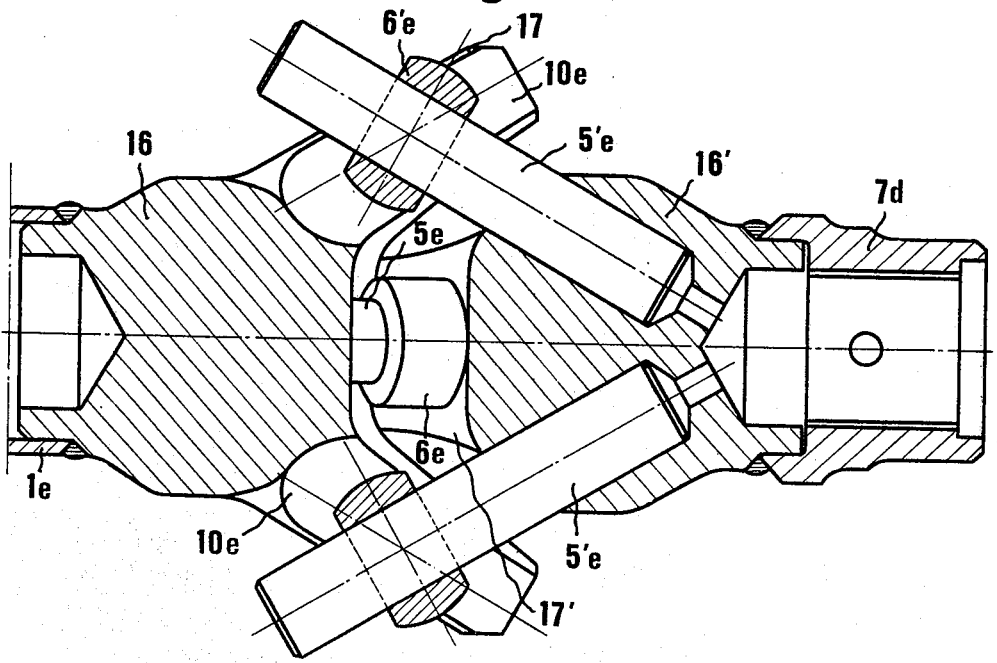
FIG. 10 is a sectional view taken on the line X—X in FIG. 9.

The embodiment shown in FIGS. 9 and 10 differs from the previous embodiments to the extent that instead of comprising a hub member integrally formed with one of the shafts and carrying four spindles on which are mounted the rollers cooperating with the grooves formed in a cup member integrally formed with the second shaft, possibly by means of a sleeve, the shaft 1e and the sleeve 7e are each fixed at their ends to identical members 16 and 16'. The member 16 carries two spindles 5e with axes in a common plane passing through the axis of the shaft 1e in a manner similar to that of one of the pairs of spindles 5 in the embodiment of FIG. 1, and two projecting portions 17 in which channels defined by grooves 10e are formed thereby providing a pair similar to one of the pairs of opposed channels in the cup member 9 of FIG. 1. The member 16', as previously noted, is identical to the member 16, and in the same way, it carries spindles 5'e and projecting portions 17' in which the grooves 10'e are formed. The spindles 5e carried by the member 16 integral with the shaft 1e cooperate through rollers 6e with grooves 10'e in the projecting portions 17' of the member 16' fixed to the other shaft by the sleeve 7e, whereas the spindles 5'e carried by the member 16' cooperate through rollers 6'e with the grooves 10e in the projecting portions 17 of the member 16.

Figure 11:
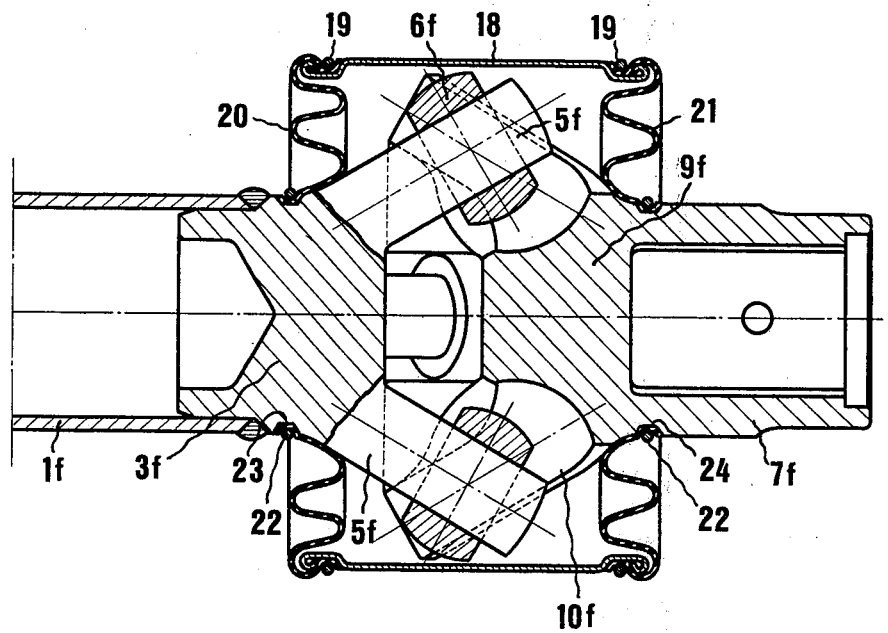
FIG. 11 is a similar view of yet one more embodiment.

FIG. 11 illustrates a joint according to the invention of the type shown in FIG. 1 (similar members are designated by the same reference numerals with a reference letter f), the difference being that the cup member 9f is formed integrally with a member having a sleeve 7f which is used to connect it to the second shaft (not shown). This joint is provided with a sealing arrangement comprising a cylindrical tube 18, made of metal or rigid plastic, to the ends of which are fastened, by means of elastic (piano string) rings 19, two diaphragm bellows 20 and 21 which are fastened respectively to the hub member 3f and the sleeve 7f by means of elastic (piano string) rings 22 which clamp the bellows in the annular grooves 23 and 24 formed in the hub member 3f and the sleeve 7f, respectively.

In addition to ensuring the fluidtightness of the joint by enabling the continuous lubrication thereof, the tube 18 fulfills an interesting function while preventing, after assembly of the joint, the rollers 6f from coming off their spindles 5f or out of their grooves 10f in case of excessive stressing of the joint during elongation. Indeed, in the absence of such tube, if the shaft 1f moves too far away from the sleeve 7f in the axial direction, the rollers 6f sliding on the spindles 5f and sliding in the grooves 10f, may come entirely out of the grooves and come off the end of the spindles 5f. The presence of the tube 18 limits the radial displacement of the rollers 6f, and therefore excessive relative axial displacement of the two shafts coupled by the joint. In order to assemble the joint, the rollers 6f are passed on the spindles 5f and they are introduced into the grooves 10f without difficulty from the ends of the latter, thereafter the sleeve 7f and the shaft 1f are urged toward each other so that the rollers are fully received in the grooves. The tube is then passed over the sleeve 7f and about the joint and the diaphram bellows 20 and 21 are fastened. Joints assembled in this manner may be stored and mounted without risks of the component part coming apart.

Various modifications and alternatives within the skills of the man in the art may be applied to the embodiments described hereinbefore within the scope of the invention defined in the appended claims. In particular, in all the above embodiments, four spindles and four corresponding channels or groups of grooves are provided, but it would also be possible to use a large number of pairs of spindles and corresponding grooves, for example six spindles and six grooves. Nevertheless, the addition of spindles may create problems of bulkiness and, practically speaking, may only be employed in very large size joints for transmitting very high torque. On the other hand, as previously indicated, the number of four spindles is the absolute minimum without which the joint does not function absolutely properly.

What we claim is:

1. A constant velocity universal joint for transmitting motion between two shafts capable of running at an angle to one another, said joint comprising at least four units each including a spindle with the number of said units being an even number, a roller and a pair of opposed grooves, each roller being slidably and rotatably mounted on a respective one of said spindles and having a part-spherical outer rolling surface, each of said shafts including a member, said pair of opposed grooves of each unit being formed in one of said members and each groove being part-circular in cross-section corresponding to the outer part-sperical surface of a respective one of said rollers and cooperating therewith; each of said units having said spindle thereof fixed relative to and mounted for movement with one of the shafts and said pair of opposed grooves thereof fixed relative to and mounted for movement with the other shaft, the longitudinal axis of said spindle being disposed in a plane passing through the axis of said one shaft and obliquely thereto, the longitudinal axis of said pair of opposed grooves being disposed in a plane passing through the axis of said other shaft and obliquely thereto, the angle formed between the longitudinal axis of said spindle and the axis of said one shaft being equal to the angle formed between the longitudinal axis of said pair of opposed grooves and said other shaft, the angular and spatial distribution of said spindles and the pairs of opposed grooves relative to their respective shafts being symmetrical when said shafts are in axial alignment.

2. A constant velocity universal joint according to claim 1, wherein said angles are between 15° and 45°.

3. A constant velocity universal joint according to claim 1, wherein there are four units.

4. A constant velocity universal joint according to claim 1, wherein the longitudinal axes of the spindles and the longitudinal axes of the pairs of opposed grooves diverge from the axis of those ones of said shafts with which they are mounted for movement, beyond the free ends thereof.

5. A constant velocity universal joint according to claim 1, wherein the longitudinal axes of the spindles and the longitudinal axes of the pairs of opposed grooves converge towards the axis of the shaft with which they are mounted for movement, beyond the free ends thereof.

6. A constant velocity universal joint according to claim 1, wherein the longitudinal axes of some of the spindles and the longitudinal axes of their corresponding pairs of opposed grooves converge towards the axis of the shaft with which they are mounted for movement, beyond the free ends thereof, and the longitudinal axes of the rest of the spindles and the longitudinal axes of their corresponding pairs of opposed grooves diverge from the axis of the shaft with which they are mounted for movement, beyond the free ends thereof.

7. A constant velocity universal joint according to claim 3, wherein all of said spindles are fixed for movement with said one shaft and all of said pairs of opposed grooves are fixed for movement with said other shaft.

8. A constant velocity universal joint according to claim 7, wherein said member of said other shaft is a cup member fixed for movement with said other shaft, and wherein said member of said one shaft is a hub member on which said spindles are fixed for movement with said one shaft.

9. A constant velocity universal joint according to claim 8, wherein said spindles are integrally formed with said hub member and said one shaft, and wherein said cup member is integrally formed with said other shaft.

10. A constant velocity universal joint according to claim 3, wherein the longitudinal axes of two of said spindles are located in a first plane perpendicular to the plane in which the axes of the other two spindles are located.

11. A constant velocity universal joint according to claim 1, further comprising means for retaining a lubricant around the joint.

12. A constant velocity universal joint according to claim 3, wherein said member on said other shaft carries two spindles cooperating with two pairs of opposed grooves formed in said member on said one shaft, and wherein the two spindles carried by said one shaft member cooperate with two pairs of opposed grooves formed in said other shaft member.

13. A constant velocity universal joint according to claim 1 wherin said member of said other shaft is a cup member fixed for movement with said other shaft, and each said pair of grooves are open to the interior of said cup member and closed to the exterior of said cup member by a peripheral portion of said cup member with said cup member having a continuous exterior surface.

14. A constant velocity universal joint according to claim 13 together with tubular means for retaining a lubricant around the joint, said tubular means having one end thereof connected to said cup member continuous exterior surface.

* * * * *